US011740819B2

(12) United States Patent
Cui et al.

(10) Patent No.: US 11,740,819 B2
(45) Date of Patent: *Aug. 29, 2023

(54) VARIABLE WIDTH SUPERBLOCK ADDRESSING

(71) Applicant: Micron Technology, Inc., Boise, ID (US)

(72) Inventors: Zhao Cui, Shanghai (CN); Eric Kwok Fung Yuen, Dublin, CA (US); Guan Zhong Wang, Shanghai (CN); Xinghui Duan, Shanghai (CN); Hua Chen Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,420

(22) Filed: Sep. 27, 2021

(65) Prior Publication Data

US 2022/0011936 A1    Jan. 13, 2022

Related U.S. Application Data

(63) Continuation of application No. 16/077,175, filed as application No. PCT/CN2017/115869 on Dec. 13, 2017, now Pat. No. 11,132,136.

(51) Int. Cl.
*G06F 3/06*        (2006.01)
*G06F 12/02*       (2006.01)

(52) U.S. Cl.
CPC ............ *G06F 3/064* (2013.01); *G06F 3/0604* (2013.01); *G06F 3/0679* (2013.01); *G06F 12/0246* (2013.01); *G06F 2212/7201* (2013.01)

(58) Field of Classification Search
None
See application file for complete search history.

(56) References Cited

U.S. PATENT DOCUMENTS 8,447,920 B1    5/2013   Syu
9,332,276 B1    5/2016   Gu et al.
(Continued)

FOREIGN PATENT DOCUMENTS

CN    102341792 A    2/2012
CN    102866956 A    1/2013
(Continued)

OTHER PUBLICATIONS

"Japanese Application Serial No. 2020-532678, Notification of Reasons for Refusal dated Sep. 21, 2021", w English translation, 5 pgs.

(Continued)

*Primary Examiner* — Kevin Verbrugge
(74) *Attorney, Agent, or Firm* — Schwegman Lundberg & Woessner, P.A.

(57) ABSTRACT

Devices and techniques for variable width superblock addressing are described herein. A superblock width, specified in number of planes, is obtained. A superblock entry is created in a translation table of a NAND device. Here, the superblock entry may include a set of blocks, from the NAND device, that have the same block indexes across multiple die of the NAND device. The number of unique block indexes are equal to the number of planes and in different planes. A request, received from a requesting entity, is performed using the superblock entry. Performing the request includes providing a single instruction to multiple die of the NAND device and multiple data segments. Here, a data segment corresponds to a block in the set of blocks specified by a tuple of block index and die. A result of the request is then returned to the requesting entity.

25 Claims, 6 Drawing Sheets

(56) References Cited

U.S. PATENT DOCUMENTS

| | | |
|---|---|---|
| 9,823,863 B1 | 11/2017 | Lu et al. |
| 11,132,136 B2 | 9/2021 | Cui et al. |
| 2008/0052446 A1 | 2/2008 | Lasser et al. |
| 2010/0228940 A1 | 9/2010 | Asnaashari et al. |
| 2012/0047409 A1 | 2/2012 | Post et al. |
| 2015/0043277 A1 | 2/2015 | Fitzpatrick et al. |
| 2016/0364155 A1 | 12/2016 | Fitzpatrick et al. |
| 2019/0205043 A1 | 7/2019 | Huang et al. |
| 2020/0249870 A1 | 8/2020 | Gola et al. |
| 2020/0293444 A1 | 9/2020 | Jain |
| 2021/0181940 A1 | 6/2021 | Cui et al. |

FOREIGN PATENT DOCUMENTS

| | | |
|---|---|---|
| CN | 112055850 A | 12/2020 |
| GB | 2530667 A | 3/2016 |
| JP | 2009211225 | 9/2009 |
| JP | 2009259145 | 11/2009 |
| JP | 2012505472 | 3/2012 |
| JP | 2012519900 | 8/2012 |
| JP | 7080975 | 5/2022 |
| WO | WO-2019113821 A1 | 6/2019 |

OTHER PUBLICATIONS

"Chinese Application Serial No. 201780098241.6, Notification to Make Rectification dated Aug. 25, 2020", w/o English Translation, 1 pg.

"European Application Serial No. 17934624.2, Extended European Search Report dated Jun. 17, 2021", 9 pgs.

"International Application Serial No. PCT/CN2017/115869, International Preliminary Report on Patentability dated Jun. 25, 2020", 6 pgs.

"International Application Serial No. PCT/CN2017/115869, International Search Report dated Sep. 12, 2018", 5 pgs.

"International Application Serial No. PCT/CN2017/115869, Written Opinion dated Sep. 12, 2018", 4 pgs.

"Korean Application Serial No. 10-2020-7019800, Notice of Preliminary Reasons for Refusal dated Jul. 18, 2022", with English translation, 6 pages.

"Korean Application Serial No. 10-2020-7019800, Response filed Sep. 23, 2022 to Notice of Preliminary Reasons for Refusal dated Jul. 18, 2022", with English claims, 21 pages.

"European Application Serial No. 17934624.2, Communication pursuant to Rules 161(2) and 162 EPC dated Jul. 23, 2020", 3 pages.

"European Application Serial No. 17934624.2, Communication Pursuant to Article 94(3) EPC dated Jan. 27, 2023", 8 pgs.

VARIABLE WIDTH SUPERBLOCK ADDRESSING

PRIORITY APPLICATION

This application is a continuation of U.S. application Ser. No. 16/077,175, filed Aug. 10, 2018, which is a U.S. National Stage Application under 35 U.S.C. 371 from international Application No. PCT/CN2017/115869, filed Dec. 13, 2017, published as WO 2019/113821, all of which are incorporated herein by reference in their entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Although NAND devices permit write and read addressing at a page level and erasure addressing at a block level, there are some practical difficulties in such fine grained resolution. These difficulties may include addressing overhead for a variety of tasks and operations, including maintenance of flash translation layer (FTL) tables. To address these issues, blocks have been aggregated into a single logical entity to which data is written. Traditionally, the aggregated blocks included blocks from every plane in every die of a NAND array. This arrangement provide some benefits, such as parallel execution of a write command across die.

The aggregated block concept permits tracking fewer storage units, relieving pressure on FTL tables and management. This can be important in resource limited devices, such as managed NAND, where available working memory (e.g., random access memory (RAM) holding system state) is limited. However, as die count and plane count increase, the aggregated block unit storage becomes large. The following table illustrates how the size of aggregated block units increase with plane and die count increases:

|  | B1X | B2X |
|---|---|---|
| Page size (KB) | 16 | 16 |
| Planes | 2 | 4 |
| Pages per block | 2304 | 5184 |
| User/Spare/Redundant blocks per plane | 456/22/24 | 204/18/14 |
| Fixed width superblock size (MB) of 4-die system | 288 | 1296 |

A few problems emerge as the aggregated block unit size grows. For example, the time to refresh the aggregated blocks becomes longer. Also, for read disturb handling, data retention handling, or asynchronous power loss handling, moving data from one aggregated block unit to another takes longer. These maintenance operations impact other NAND operations on these blocks and can lead to increased latency to the device (e.g., it takes longer for the device to respond to a host read or write command).

In addition to increased times to perform maintenance on the NAND devices, large aggregates of blocks may also lead to wasted storage when an aggregated block unit is used as the smallest effective addressable entity in managed NAND devices. For example, the device may reserve space for usage apart from user data or meta data, such as reserving refresh storage as a temporary space used during data copies—e.g., for a refresh, data is copied from source storage to refresh storage, the source storage is erased, and then the data is copied back from the refresh storage to the source storage. Another example occurs when there is program error. Here, the device replaces a bad storage section (e.g., aggregated block unit) with a good one, using a reserved storage section to replace the bad section. Large aggregated block units on reserve for bad block replacement reduce the effective over provisioning (OP) for the NAND device (e.g., fewer reserves can be used and still meet storage use goals for the device). Thus, if there are only around 200 blocks in a plane (e.g., B2X in Table 1), one block reservation means 0.5% OP loss. Less OP will impact system performance and endurance.

A variable width superblock can address the aggregate block unit problems noted above while allowing for efficient FTL in a managed NAND device. The aggregated block unit described above spans all planes of all die in a NAND array. This aggregated block unit has been called a superblock at times. However, it is differentiated from the term superblock as used herein. As used herein, superblock refers to a combination of blocks that span at least two die. The blocks across these die have the same address within a die. Thus, a block A in die Z is combined with a block A in die Y to form a superblock. Due to this definition, some embodiments may be considered a "sub-superblock" when compared to the traditional use of "superblock." Thus, unlike aggregated block units, a superblock can omit blocks from some planes on die. For example, on NAND array with two die that each have four planes, an aggregated block unit would include a block from each plane (all four) on each die (all two) whereas a superblock can comprise blocks from less than all planes (e.g., two planes) on each die (all two). The number of planes used in a superblock are its width. While any number of planes may be used to construct superblocks, there may be advantages to selecting fractions of an aggregated block unit for a superblock width. For example, a single bit may be used to signal a high super block or a low superblock with respect to an aggregated block unit to define a superblock that is half the width of the aggregated block unit. In this example, low superblock may be the first half of planes as measured by plane index and the high superblock is the remaining planes.

Using superblocks as a basic operational unit in the NAND device provides the efficient resource management discussed above with respect to aggregated block units while permitting more efficient maintenance operations (e.g., reduced latency and time to perform the operations) and effective device OP.

Superblocks provide a number of optimization opportunities by allowing for variable widths. Large superblocks provide higher bandwidth resulting in better sequential read and write performance. However, in some scenarios, performance is hampered by a host interface and not NAND array bandwidth, such as in Serial Advanced Technology Attachment (SATA), Peripheral Component Interconnect Express (PCIe), or Non-Volatile Memory Express (NVMe) host interfaces. In these scenarios, superblock width is reduced to lower maintenance operation times, lower Op loss, etc., without impacting device throughput from the host.

With these performance tradeoffs, superblock widths can be tailored to the type of data being stored. For example, meta data—such as FTL table and other system information data—is often less sensitive to bandwidth issues than is user data. Thus, smaller width superblocks can be used to store meta data while full width (e.g., aggregated block unit sized) superblocks store user data. Additional details and examples are described below.

Figure 1:
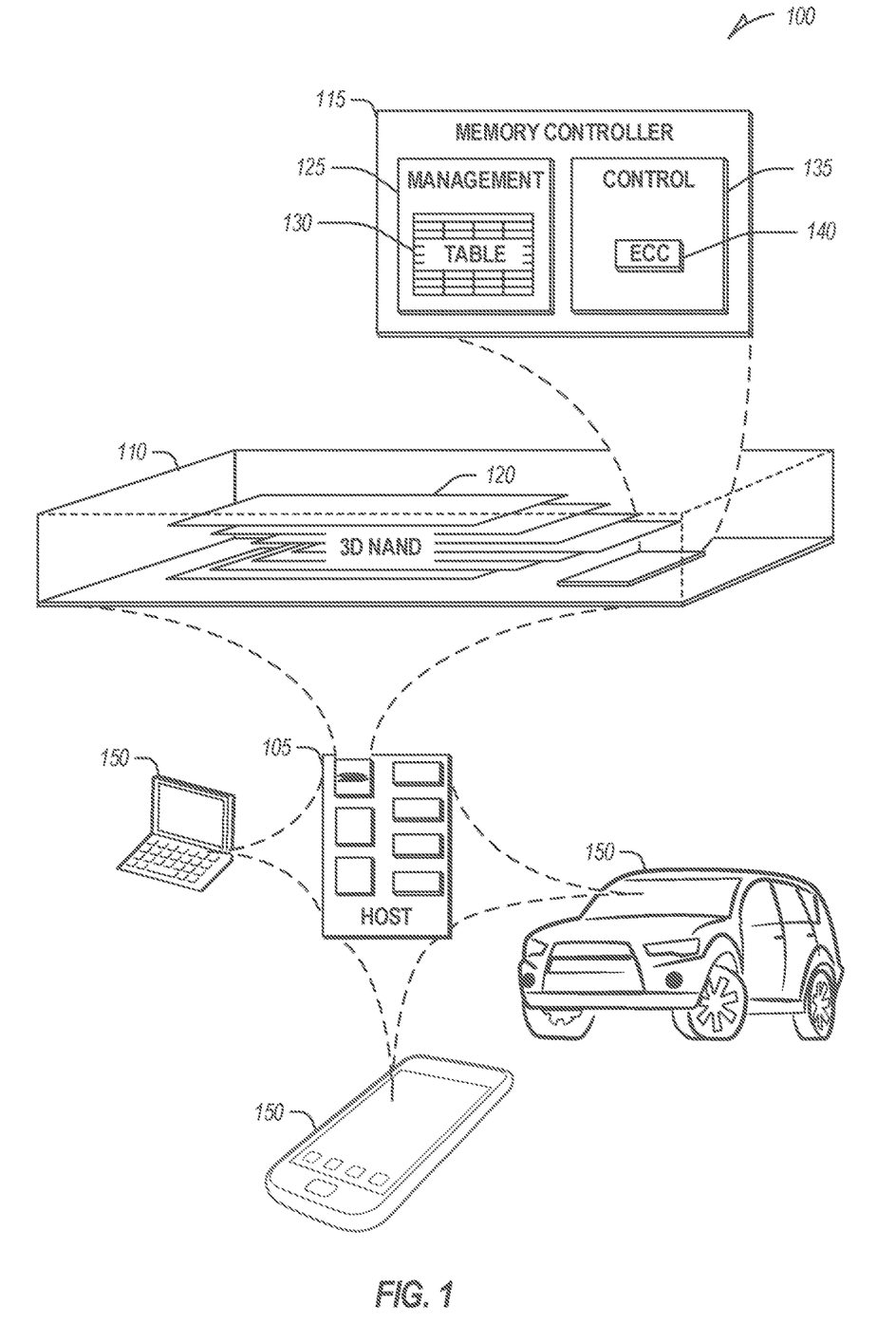
FIG. 1 illustrates an example of an environment including a memory device.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 600 of FIG. 6.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

The memory controller 115 may implement a flash translation layer (FTL) using superblocks. The memory controller 115 is arranged to obtain a superblock width. The memory controller 115 may receive the width (e.g., from the host 105, from a boot-process, etc.) or may retrieve the width (e.g., from the array 120, from an external storage device, read-only memory, etc.). The width specifies a number of die planes. Thus, a width of one is one die plane, a width of two is two die planes, etc.

In an example, the number of planes are specified as a percentage. Here, the percentage is with respect to a total number of planes in a die. Thus, if a die has four planes, a 25% width is one plane. In an example, the percentage is fifty percent. In an example, the number of planes is less than planes in a die of the memory device 110 (e.g., within the array 120). This is in contrast to a complete superblock that includes a block at a unique index for every plane in the die and spans all die of the memory device 110. A complete superblock operates like an aggregated block unit but differs because it is based on a defined width, obtained by the memory controller 115. In an example, user data is stored in a complete superblock and NAND device meta data is stored in the superblock. This mixed use of superblock widths allows for flexible management of device bandwidth and latency or OP reductions depending on anticipated or dynamically measured (e.g., during device operation) usage.

In an example, the superblock is one of a set of superblocks. Here, the set of superblocks include a block at a unique index for every plane in the die across all die of the memory device 110. Thus, given four planes, there are four superblocks. A first superblock with a block in plane one of each die, a second superblock with a block in plane two of each die, a third super block with a block in plane three of each die, and a fourth superblock with a block in plane four of each die. The blocks for a superblock have the same intra-die index across die. For example, if a superblock has block zero in die zero, it also has block zero in die one, in die two, and in die three. In an example, the superblock is differentiated from other members in the set of superblocks by a position of planes represented in the set of blocks. Here, the position of the planes is measured by an index, such that each plane is numbered (e.g., 0-N) within a die. In an example, the set of superblocks has two members and the position of planes is high or low, high corresponding to one half of the planes with high indices and low corresponding to remaining planes on the die. As noted above, this time of arrangement may provide efficiency by using allowing the superblock to be addressed by a block index (e.g., block one) and a single bit to indicate whether the high or low planes constitute the superblock. Because block indexes may cross planes, a subsequent plane block designation can be derived from a single block index designation by a set distribution. For example, a first block in plane zero may have an index of zero while a first block in plane one may have an index of five hundred and three. Here, the super block can be referenced by the low bit (e.g., set to zero) and a block index of zero, which is converted by the distribution to be blocks zero and five hundred and three, for example.

The memory controller 115 is arranged to create a superblock entry in the translation table (e.g., table 13) of the memory device 110. Here, the superblock entry includes a set of blocks from the array 120. The set of blocks have block indexes that are the same across multiple die of the array 120. The number of unique block indexes is equal to the number of planes and in different planes. Thus, a given superblock is composed of blocks in different planes of a die, each block having an index specific to the die. The same superblock has blocks with the same indices in all other die of the array 120. As noted above, some members of the set of blocks can be defined by a distribution, or other function, based off of one block index. Thus, the entry can be a single block index and a width, the distribution defining the remaining block indexes that comprise the set of blocks within one die, the block indexes also applying to the remaining dies.

The memory controller 115 is arranged to receive a request from a requesting entity, such as the host 105. In an example, the request is a write. In an example, the request is a read. In an example, the request is a refresh. In an example, the request is garbage collection. With respect to the refresh or garbage collection requests, the memory controller 115 may receive the request from itself, for example, via a trigger, self-diagnostic, or the like (e.g., as performed by the memory manager 125). The memory controller 115 is arranged to perform using the superblock entry. To accomplish this, the memory controller 115 is arranged to provide a single instruction to multiple die of the array 120 along with multiple data segments. Here, a data segment in the multiple data segments corresponds to a block in the set of blocks specified by a tuple of block index and die. This parallelism increases array 120 throughput, and thus increases performance of the memory device 110. The memory controller 115 is arranged to then return the result of performing the request to the requesting entity.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 may include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (FCC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc. associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
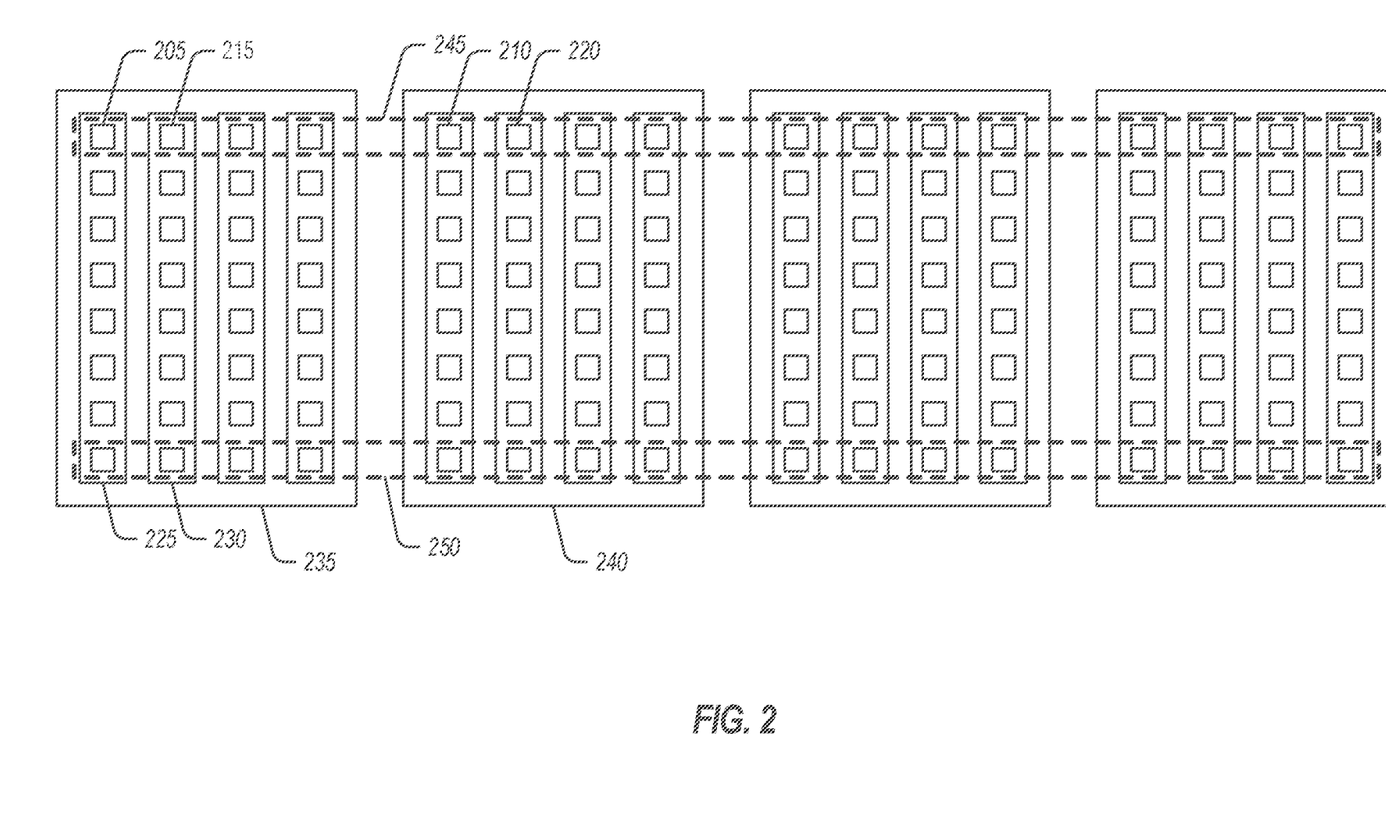
FIG. 2 illustrates an example of superblocks.

FIG. 2 illustrates an example of superblocks. Superblock 245 and superblock 250 are both complete, or full width, superblocks, spanning all four planes of all four die. To illustrate the block index relationship between planes and die, some blocks in each superblock are noted in FIG. 2. For example, superblock 245 includes blocks 205 and 215 of planes 225 and 230 respectively. As noted above, block indexes may not start over between planes. Thus, the block indexes for 205 and 215 are different even if they are both the first blocks in their respective planes. However, blocks 205 and 215 have the same indexes in die 235 as do blocks 210 and 220 in die 240. Thus, the set of blocks need only specify the indexes within a single die, and these indexes are applied across all die to create the superblock. In examples where block indexing restarts within a plane, then the superblock may be specified by a single index and a set of planes. Also, as illustrated, each superblock 245 and 250 has at most one block given a unique combination of die and plane, although other examples can include multiple blocks per plane.

Figure 3:
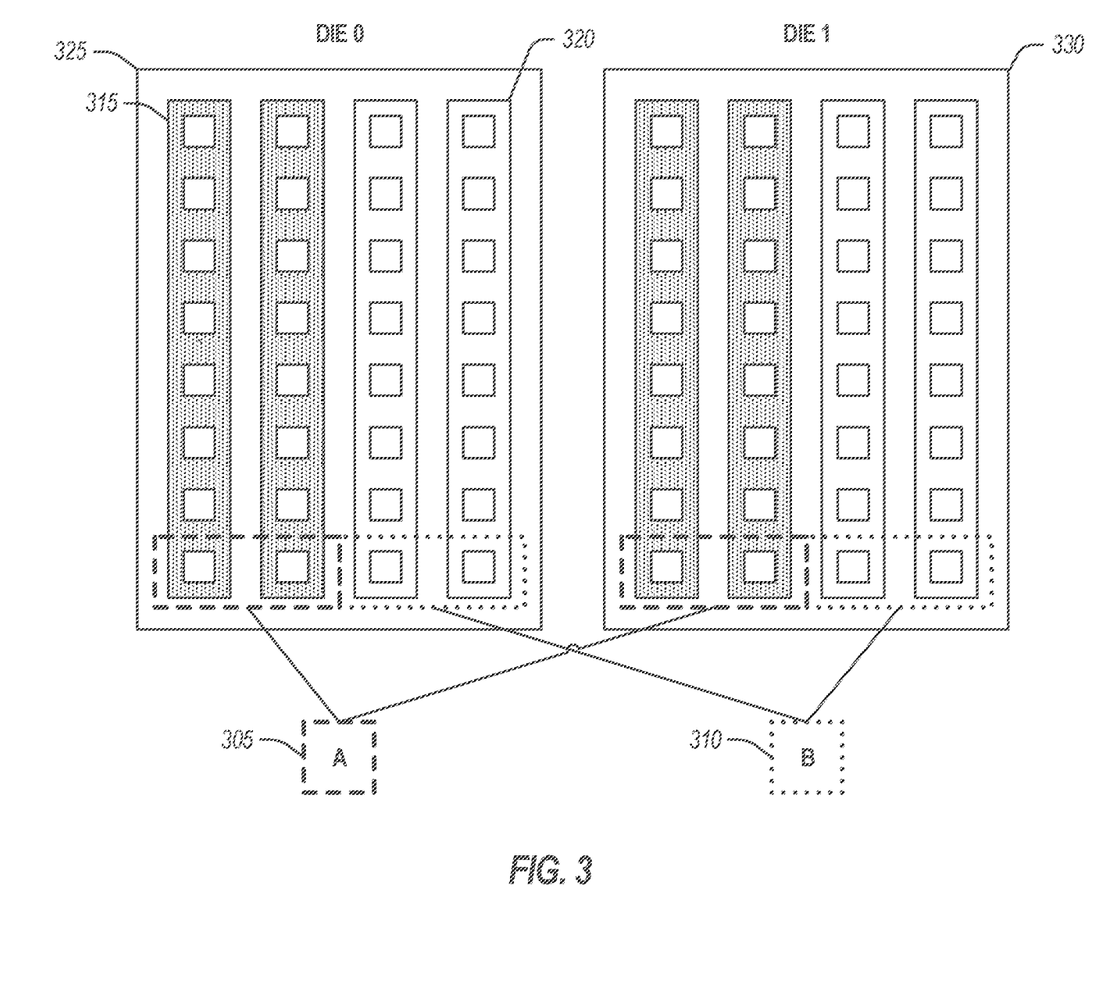
FIG. 3 illustrates an example of variable width superblocks.

FIG. 3 illustrates an example of variable width superblocks, superblock A 305 and superblock B 310. Here, each superblock A 305 and superblock B 310 has a width of two. Superblock A 305 comprises blocks from the lower order planes 315 (shaded) across DIE 0 325 and DIE 1 330. Superblock B 310 comprises blocks from higher order planes 320 across DIE 0 325 and DIE 1 330. The illustrated examples are of half-width (e.g., 50%) superblocks.

Figure 4:
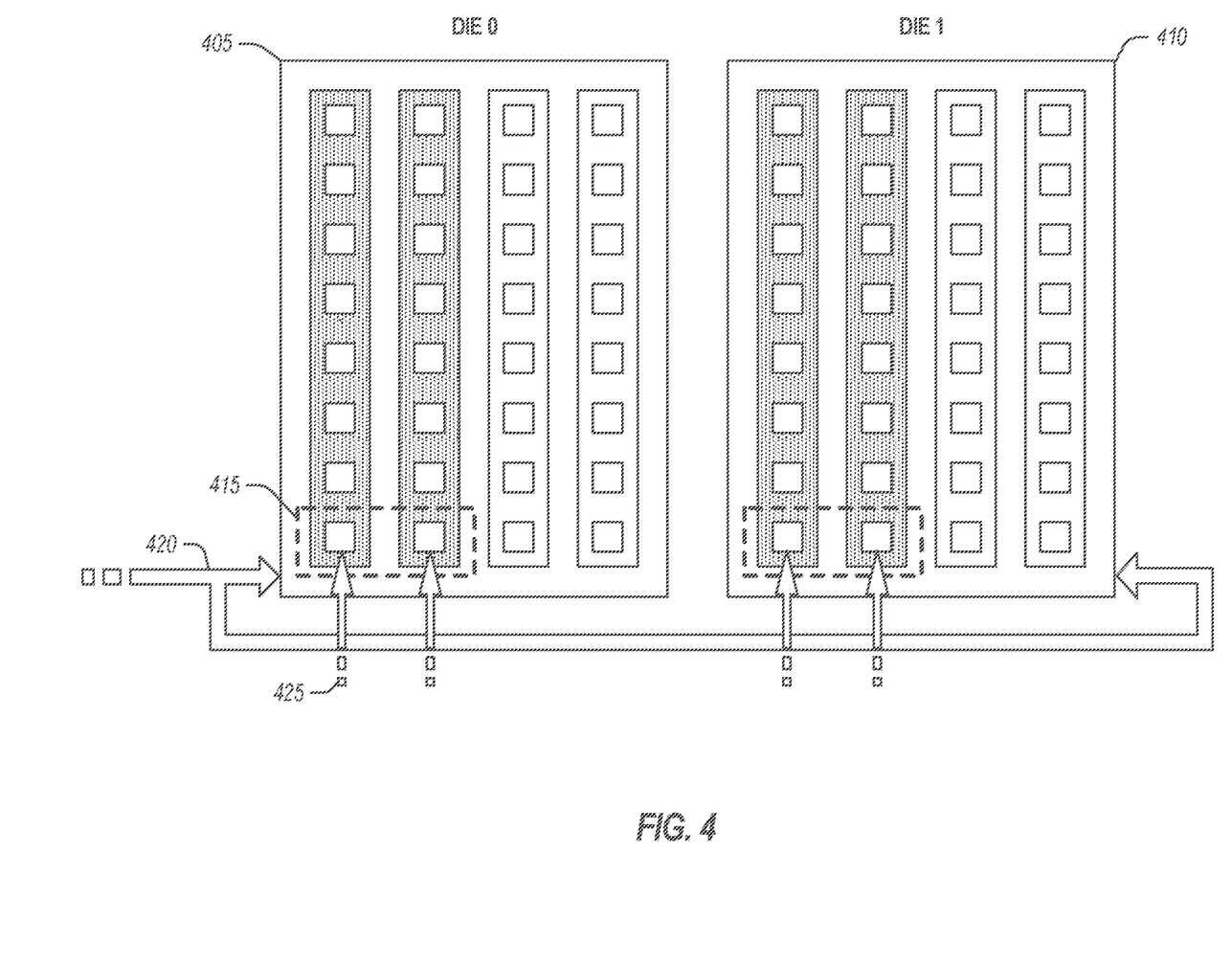
FIG. 4 illustrates an example of writing to a variable width superblock.

FIG. 4 illustrates an example of writing to a variable width superblock. The superblock 415 (comprising blocks within the dashed line) is written to by providing a single (e.g., the same) write command 420 to DIE 0 405 and DIE 1 410, while providing block specific data segments 425. The die perform the write 420 in parallel (although the write for each block in DIE 0 405, for example, may be serial).

Figure 5:
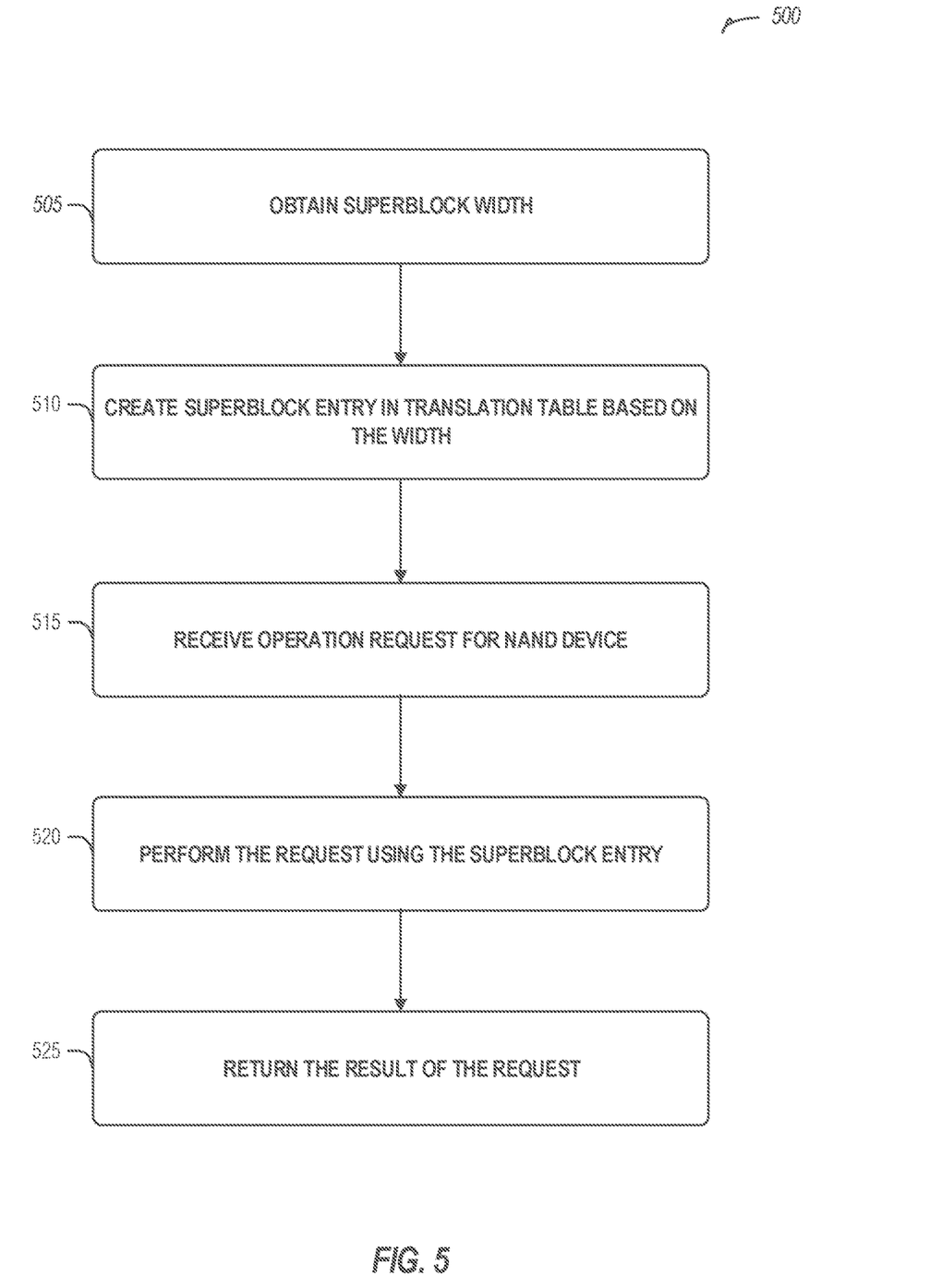
FIG. 5 illustrates a flowchart of a method for variable width superblock addressing.

FIG. 5 illustrates a flowchart of a method 500 for variable width superblock addressing. The operations of the method 500 are performed on electronic hardware, such as that described herein (e.g., circuitry).

At operation 505, a superblock width is obtained (e.g., retrieved or received). In an example, the width is specified in number of planes. In an example, the number of planes are specified as a percentage. In an example, the percentage is fifty percent.

In an example, the number of planes is less than planes in a die. In an example, a complete superblock includes a block at a unique index for every plane in the die and spans all die of a device. In an example, user data is stored in a complete superblock and device meta data is stored in the superblock.

In an example, the superblock is one of a set of superblocks. In an example, the set of superblocks includes a block at a unique index for every plane in the die across all die of a device. In an example, the superblock is differentiated from other members in the set of superblocks by a position of planes represented in the set of blocks. In an example, the set of superblocks has two members and the position of planes is high or low. Here, high corresponds to one half of the planes with high indices and low corresponds to remaining planes on the die.

At operation 510, a superblock entry is created in a translation table. In an example, the superblock entry including a set of blocks from the device. Here the set of blocks have block indexes that are the same across multiple die of the device, with a number of unique block indexes equal to the number of planes and in different planes.

At operation 515, a request is received from a requesting entity. In an example, the request is a write. In an example, the request is a read. In an example, the request is a refresh. In an example, the request is garbage collection.

At operation 520, the request is performed using the superblock entry to produce a result. To perform the request, a single instruction to multiple die of the device and multiple data segments are provided. Here, a data segment in the multiple data segments corresponds to a block in the set of blocks specified by a tuple of block index and die.

At operation 525, the result is returned to the requesting entity.

Figure 6:
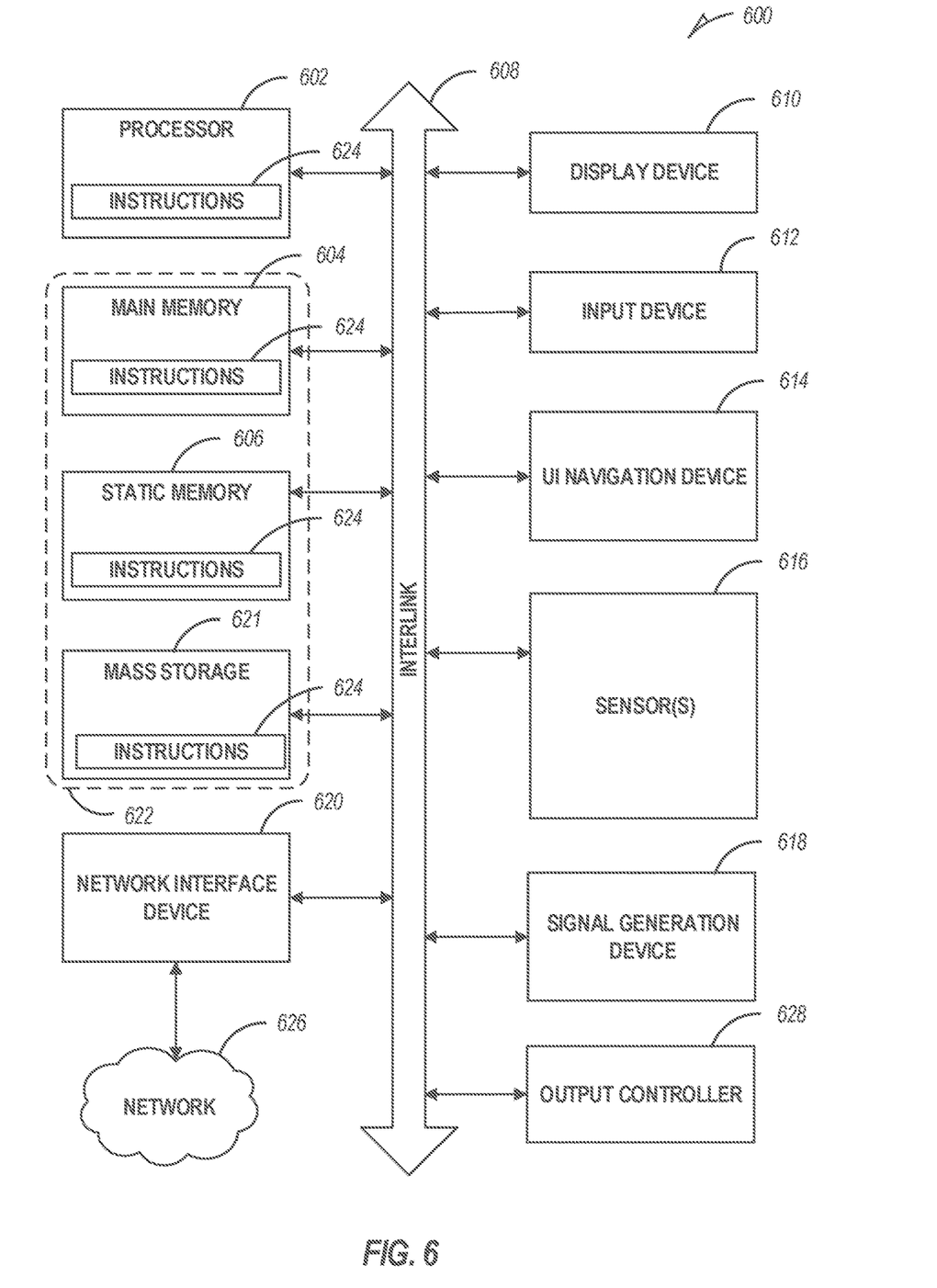
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110, etc.) can include a hardware processor 602 (e.g., a central processing unit (CPU), a graphics processing unit (GPU), a hardware processor core, or any combination thereof, such as the memory controller 115, etc.), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 616, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute the machine readable medium 622.

While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Nonlimiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMCT™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-FI®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL EXAMPLES

Example 1 is a NAND device for variable width superblock addressing in NAND, the NAND device comprising: A NAND array; and a controller to: obtain a superblock width specified in number of planes; create a superblock entry in a translation table of the NAND device, the superblock entry including a set of blocks from the NAND array, the set of blocks having block indexes that are the same across multiple die of the NAND array, with a number of unique block indexes equal to the number of planes and in different planes; receive a request from a requesting entity; perform the request, to produce a result, using the superblock entry through: a single instruction to multiple die of the NAND device; and multiple data segments, a data segment in the multiple data segments corresponding to a block in the set of blocks specified by a tuple of block index and die; and return the result to the requesting entity.

In Example 2, the subject matter of Example 1 includes, wherein the number of planes are specified as a percentage.

In Example 3, the subject matter of Example 2 includes, wherein the percentage is fifty percent.

In Example 4, the subject matter of Examples 1-3 includes, wherein the number of planes is less than planes in a die of the NAND array.

In Example 5, the subject matter of Example 4 includes, wherein a complete superblock includes a block at a unique index for every plane in the die and spans all die of the NAND array.

In Example 6, the subject matter of Example 5 includes, wherein user data is stored in a complete superblock and NAND device meta data is stored in the superblock.

In Example 7, the subject matter of Examples 4-6 includes, wherein the superblock is one of a set of superblocks, the set of superblocks including a block at a unique index for every plane in the die across all die of the NAND array.

In Example 8, the subject matter of Example 7 includes, wherein the superblock is differentiated from other members in the set of superblocks by a position of planes represented in the set of blocks.

In Example 9, the subject matter of Example 8 includes, wherein the set of superblocks has two members and the position of planes is high or low, high corresponding to one half of the planes with high indices and low corresponding to remaining planes on the die.

In Example 10, the subject matter of Examples 1-9 includes, wherein the request is a write.

In Example 11, the subject matter of Examples 1-10 includes, wherein the request is a read.

In Example 12, the subject matter of Examples 1-11 includes, wherein the request is a refresh.

In Example 13, the subject matter of Examples 1-12 includes, wherein the request is garbage collection.

Example 14 is a method for variable width superblock addressing in NAND, the method comprising: obtaining a superblock width specified in number of planes; creating a superblock entry in a translation table of a NAND device, the superblock entry including a set of blocks from the NAND device, the set of blocks having block indexes that are the same across multiple die of the NAND device, with a number of unique block indexes equal to the number of planes and in different planes; receiving a request from a requesting entity; performing the request, to produce a result, using the superblock entry by providing: a single instruction to multiple die of the NAND device; and multiple data segments, a data segment in the multiple data segments corresponding to a block in the set of blocks specified by a tuple of block index and die; and returning the result to the requesting entity.

In Example 15, the subject matter of Example 14 includes, wherein the number of planes are specified as a percentage.

In Example 16, the subject matter of Example 15 includes, wherein the percentage is fifty percent.

In Example 17, the subject matter of Examples 14-16 includes, wherein the number of planes is less than planes in a die of the NAND device.

In Example 18, the subject matter of Example 17 includes, wherein a complete superblock includes a block at a unique index for every plane in the die and spans all die of the NAND device.

In Example 19, the subject matter of Example 18 includes, wherein user data is stored in a complete superblock and NAND device meta data is stored in the superblock.

In Example 20, the subject matter of Examples 17-19 includes, wherein the superblock is one of a set of superblocks, the set of superblocks including a block at a unique index for every plane in the die across all die of the NAND device.

In Example 21, the subject matter of Example 20 includes, wherein the superblock is differentiated from other members in the set of superblocks by a position of planes represented in the set of blocks.

In Example 22, the subject matter of Example 21 includes, wherein the set of superblocks has two members and the position of planes is high or low, high corresponding to one half of the planes with high indices and low corresponding to remaining planes on the die.

In Example 23, the subject matter of Examples 14-22 includes, wherein the request is a write.

In Example 24, the subject matter of Examples 14-23 includes, wherein the request is a read.

In Example 25, the subject matter of Examples 14-24 includes, wherein the request is a refresh.

In Example 26, the subject matter of Examples 14-25 includes, wherein the request is garbage collection.

Example 27 is at least one machine readable medium including instructions that, when executed by a machine, cause the machine to perform any method of Examples 14-26.

Example 28 is a system comprising means to perform any method of Examples 14-26.

Example 29 is a machine readable medium including instructions for variable width superblock addressing in NAND, the instructions, when executed by a machine, cause the machine to perform operations comprising: obtaining a superblock width specified in number of planes; creating a superblock entry in a translation table of a NAND device, the superblock entry including a set of blocks from the NAND device, the set of blocks having block indexes that are the same across multiple die of the NAND device, with a number of unique block indexes equal to the number of planes and in different planes; receiving a request from a requesting entity; performing the request, to produce a result, using the superblock entry by providing: a single instruction to multiple die of the NAND device; and multiple data segments, a data segment in the multiple data segments corresponding to a block in the set of blocks specified by a tuple of block index and die; and returning the result to the requesting entity.

In Example 30, the subject matter of Example 29 includes, wherein the number of planes are specified as a percentage.

In Example 31, the subject matter of Example 30 includes, wherein the percentage is fifty percent.

In Example 32, the subject matter of Examples 29-31 includes, wherein the number of planes is less than planes in a die of the NAND device.

In Example 33, the subject matter of Example 32 includes, wherein a complete superblock includes a block at a unique index for every plane in the die and spans all die of the NAND device.

In Example 34, the subject matter of Example 33 includes, wherein user data is stored in a complete superblock and NAND device meta data is stored in the superblock.

In Example 35, the subject matter of Examples 32-34 includes, wherein the superblock is one of a set of superblocks, the set of superblocks including a block at a unique index for every plane in the die across all die of the NAND device.

In Example 36, the subject matter of Example 35 includes, wherein the superblock is differentiated from other members in the set of superblocks by a position of planes represented in the set of blocks.

In Example 37, the subject matter of Example 36 includes, wherein the set of superblocks has two members and the position of planes is high or low, high corresponding to one half of the planes with high indices and low corresponding to remaining planes on the die.

In Example 38, the subject matter of Examples 29-37 includes, wherein the request is a write.

In Example 39, the subject matter of Examples 29-38 includes, wherein the request is a read.

In Example 40, the subject matter of Examples 29-39 includes, wherein the request is a refresh.

In Example 41, the subject matter of Examples 29-40 includes, wherein the request is garbage collection.

Example 42 is a system for variable width superblock addressing in NAND, the system comprising: means for obtaining a superblock width specified in number of planes; means for creating a superblock entry in a translation table of a NAND device, the superblock entry including a set of blocks from the NAND device, the set of blocks having block indexes that are the same across multiple die of the NAND device, with a number of unique block indexes equal to the number of planes and in different planes; means for receiving a request from a requesting entity; means for performing the request, to produce a result, using the superblock entry by providing: a single instruction to multiple die of the NAND device; and multiple data segments, a data segment in the multiple data segments corresponding to a block in the set of blocks specified by a tuple of block index and die; and means for returning the result to the requesting entity.

In Example 43, the subject matter of Example 42 includes, wherein the number of planes are specified as a percentage.

In Example 44, the subject matter of Example 43 includes, wherein the percentage is fifty percent.

In Example 45, the subject matter of Examples 42-44 includes, wherein the number of planes is less than planes in a die of the NAND device.

In Example 46, the subject matter of Example 45 includes, wherein a complete superblock includes a block at a unique index for every plane in the die and spans all die of the NAND device.

In Example 47, the subject matter of Example 46 includes, wherein user data is stored in a complete superblock and NAND device meta data is stored in the superblock.

In Example 48, the subject matter of Examples 45-47 includes, wherein the superblock is one of a set of superblocks, the set of superblocks including a block at a unique index for every plane in the die across all die of the NAND device.

In Example 49, the subject matter of Example 48 includes, wherein the superblock is differentiated from other members in the set of superblocks by a position of planes represented in the set of blocks.

In Example 50, the subject matter of Example 49 includes, wherein the set of superblocks has two members and the position of planes is high or low, high corresponding to one half of the planes with high indices and low corresponding to remaining planes on the die.

In Example 51, the subject matter of Examples 42-50 includes, wherein the request is a write.

In Example 52, the subject matter of Examples 42-51 includes, wherein the request is a read.

In Example 53, the subject matter of Examples 42-52 includes, wherein the request is a refresh.

In Example 54, the subject matter of Examples 42-53 includes, wherein the request is garbage collection.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 30 semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An apparatus comprising:
an interface to a NAND array; and
processing circuitry configured to:
create a superblock based on a superblock width specified in NAND die planes by creating a superblock entry in a data structure, the superblock entry including the superblock width and a block index that together define a set of blocks from the NAND array that are in the superblock;
receive a request from a requesting entity;
perform the request, to produce a result, on the superblock using the superblock entry to obtain the set of blocks of the superblock, the request performed by a single instruction to multiple die of the NAND array via the interface to the NAND array; and
notify the requesting entity of the result.

2. The apparatus of claim 1, wherein the superblock is one of a set of superblocks collocated on die in the NAND array and covering all planes of die in the NAND array.

3. The apparatus of claim 2, wherein the superblock is differentiated from other members in the set of superblocks by a position of planes that are part of the superblock.

4. The apparatus of claim 3, wherein the set of superblocks has two members and the position of the planes is high or low, high corresponding to one half of the planes with high indices and low corresponding to remaining planes on the die.

5. The apparatus of claim 4, wherein the data structure includes a single bit to indicate high or low, and wherein, to perform the request on the superblock using the superblock entry, the request includes a block index and the request is performed on the block index modified by the single bit.

6. The apparatus of claim 1, wherein the request is a write, a read, a refresh, or garbage collection.

7. The apparatus of claim 1, wherein the processing circuitry is configured to receive the superblock width.

8. The apparatus of claim 1, wherein the superblock width is specified as a percentage of a complete superblock.

9. The apparatus of claim 8, wherein the superblock width is at least fifty percent.

10. The apparatus of claim 8, wherein a complete superblock includes a block at a unique index for every plane in the die and spans all die of the NAND array.

11. The apparatus of claim 8, wherein user data is stored in a complete superblock and NAND device meta data is stored in the superblock.

12. The apparatus of claim 1, wherein the data structure is a translation table.

13. The apparatus of claim 1, wherein the interface complies with a Universal Flash Storage (UFS) family of standards.

14. An apparatus comprising:
a NAND array including multiple NAND die, a NAND die including blocks arranged in multiple planes;
processing circuitry configured to:
create a superblock based on a superblock width specified in NAND die planes by creating a superblock entry in a data structure, the superblock entry including the superblock width and a block index that together define a set of blocks from the NAND array that are in the superblock;
receive a request from a requesting entity; and
perform the request on the superblock using the superblock entry to obtain the set of blocks of the superblock, the request performed by a single instruction to the multiple NAND die of the NAND array; and
packaging to:
house the NAND array and the processing circuitry; and
an interface configured to enable communications between the processing circuitry and the requesting entity, the interface being used to receive the request from the requesting entity.

15. The apparatus of claim 14, wherein the superblock is one of a set of superblocks collocated on die in the NAND array and covering all planes of die in the NAND array.

16. The apparatus of claim 15, wherein the superblock is differentiated from other members in the set of superblocks by a position of planes that are part of the superblock.

17. The apparatus of claim 16, wherein the set of superblocks has two members and the position of the planes is high or low, high corresponding to one half of the planes with high indices and low corresponding to remaining planes on the die.

18. The apparatus of claim 17, wherein the data structure includes a single bit to indicate high or low, and wherein, to perform the request on the superblock using the superblock entry, the request includes a block index and the request is performed on the block index modified by the single bit.

19. The apparatus of claim 14, wherein the request is a write, a read, a refresh, or garbage collection.

20. The apparatus of claim 14, wherein the processing circuitry is configured to receive the superblock width.

21. The apparatus of claim 14, wherein the superblock width is specified as a percentage of a complete superblock.

22. The apparatus of claim 21, wherein the superblock width is at least fifty percent.

23. The apparatus of claim 21, wherein a complete superblock includes a block at a unique index for every plane in the die and spans all die of the NAND array.

24. The apparatus of claim 21, wherein user data is stored in a complete superblock and NAND device meta data is stored in the superblock.

25. The apparatus of claim 14, wherein the data structure is a translation table.

* * * * *